United States Patent
Moses et al.

(10) Patent No.: US 12,283,418 B2
(45) Date of Patent: Apr. 22, 2025

(54) ELECTRODE DESIGN FOR LIFT AUGMENTATION AND POWER GENERATION OF ATMOSPHERIC ENTRY VEHICLES DURING AEROCAPTURE AND ENTRY, DESCENT, AND LANDING MANEUVERS

(71) Applicant: UNITED STATES OF AMERICA AS REPRESENTED BY THE ADMINISTRATOR OF NASA, Washington, DC (US)

(72) Inventors: Robert W. Moses, Poquoson, VA (US); Foy M. Cheatwood, Norfolk, VA (US); Christopher O. Johnston, Yorktown, VA (US); Sergey Macheret, West Lafayette, IN (US); Bernard Parent, Tucson, AZ (US); Justin Little, Seattle, WA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 286 days.

(21) Appl. No.: 17/727,401

(22) Filed: Apr. 22, 2022

(65) Prior Publication Data

US 2022/0348362 A1 Nov. 3, 2022

Related U.S. Application Data

(60) Provisional application No. 63/178,720, filed on Apr. 23, 2021, provisional application No. 63/178,761, filed on Apr. 23, 2021.

(51) Int. Cl.
*B64G 1/62* (2006.01)
*B64G 1/24* (2006.01)
(Continued)

(52) U.S. Cl.
CPC ......... *H01F 7/0273* (2013.01); *B64G 1/2421* (2023.08); *B64G 1/62* (2013.01); *H01F 7/02* (2013.01); *H01F 7/20* (2013.01)

(58) Field of Classification Search
CPC ................................................... B64G 1/2421
See application file for complete search history.

(56) References Cited

U.S. PATENT DOCUMENTS

| 2,973,162 A | 2/1961 | Haeussermann |
| 3,162,398 A | 12/1964 | Clauser et al. |

(Continued)

OTHER PUBLICATIONS

Craig Steeves et al, A Magentohydrodynamic Power Panel for Space Reentry Vehicles, Jan. 6, 2006, American Society of Mechanical Engineers Journal for Applied Mechanics, vol. 74 Issue 1. (Year: 2006).*

(Continued)

*Primary Examiner* — Joshua J Michener
*Assistant Examiner* — Ryan Andrew Yankey
(74) *Attorney, Agent, or Firm* — M. Bruce Harper; Robin W. Edwards; Trenton J. Roche

(57) ABSTRACT

A magnetohydrodynamic (MHD) flow control mechanism is described which substantially improves the existing processes in that smaller magnetic fields, requiring far less mass, may be placed away from the forebody of the spacecraft to produce Lorentz forces that augment the lift and the drag forces for guidance, navigation, and control of the spacecraft. The MHD flow control mechanism may also be configured to provide additional thermal protection of the electrodes therein.

19 Claims, 13 Drawing Sheets

(51) Int. Cl.
H01F 7/02 (2006.01)
H01F 7/20 (2006.01)

(56) References Cited

U.S. PATENT DOCUMENTS

| | | | | |
|---|---|---|---|---|
| 3,176,227 | A * | 3/1965 | Bender | H01Q 1/28 |
| | | | | 343/705 |
| 3,325,123 | A * | 6/1967 | Null | F42B 10/60 |
| | | | | 244/3.21 |
| 3,360,220 | A * | 12/1967 | Meyer | B64C 23/005 |
| | | | | 310/11 |
| 3,392,941 | A * | 7/1968 | Cason, III | B64G 1/62 |
| | | | | 244/3.21 |
| 3,662,554 | A | 5/1972 | De Broqueville | |
| 3,826,452 | A | 7/1974 | Little | |
| 5,273,465 | A * | 12/1993 | Meng | H02K 44/00 |
| | | | | 114/67 R |
| 5,791,275 | A * | 8/1998 | Bandyopadhyay | B63G 8/34 |
| | | | | 114/67 R |
| 6,059,236 | A | 5/2000 | Tsunoda | |
| 12,125,636 | B2 * | 10/2024 | Moses | H01F 7/0273 |
| 2014/0144517 | A1 | 5/2014 | Raja et al. | |
| 2020/0262546 | A1 * | 8/2020 | Farouz-Fouquet | H01T 23/00 |
| 2022/0340308 | A1 * | 10/2022 | Moses | B64G 1/62 |

OTHER PUBLICATIONS

Lockwood, Mary Kae, "Neptune Aerocapture Systems Analysis," AIAA Atmospheric Flight Mechanics Conference and Exhibit, Aug. 16-19, 2004, pp. 1-16, Paper 2004-4951, Providence, Rhode Island.
Edquist, Karl T., et al., "Configuration, Aerodynamics, and Stability Analysis for a Neptune Aerocapture Orbiter," AIAA Atmospheric Flight Mechanics Conference and Exhibit, Aug. 16-19, 2004, pp. 1-12, Paper 2004-4953, Providence, Rhode Island.
A. R. Kantorwitz, "A survey of physical phenomena occurring in flight at extreme speeds," in Proceedings of the Conference on High-Speed Aeronautics, 1995, pp. 335-339, edited by A. Ferri, N. J. Hoff, and p. A. Libby, Polytechnic Institute of Brooklyn, New York.
R.W. Ziemer, et al., Phys. Rev. Letters, 1958, pp. 58-59, vol. 1.
E. L. Resler, et al., "The prospects of magneto-aerodynamics," J. Aeronatut. Sci., 1958, pp. 235-245; 258, vol. 25, Issue 235.
J. Poggie, et al., "Magnetic control of flow past a blunt body: Numerical validation and exploration," Phys. Fluids, 2022, pp. 1720-1731, Vo. 14.
H. Otsu, et al., "Reentry heating mitigation by utilizing the Hall effect," AIAA, 2004, pp. 1-8, Paper 2004-2167.
H. Otsu, et al., "Influence of the Hall effect on the electrodynamic heat shield system for reentry vehicles," AIAA, 2010, pp. 1-9, vol. 48, No. 10.
Y. Takizawa, et al., "Electro-magnetic effect on reentry-related high-enthalpy flow," AIAA, 2003, pp. 1-7, serial No. 2003-4168.
Y. Takizawa, et al., "Electro-Magnetic Effect on Shock Layer Structure in Reentry Related High-Enthalpy Flow," AIAA, 2004, pp. 1-10, serial No. 2004-2162.
Y. Takizawa, et al., "Experiment on shock layer enhancement by electro-magnetic effect in reentry-related high-enthalpy flow," AIAA, 2005, pp. 1-6, serial No. 2005-4786.
Thompson, Kyle, et al., LAURA User's Manual: 5.6, Feb. 2020, pp. 1-105.
Fujino, T., et al., "Numerical Studies of Influences of Hall Effect on MHD Flow Control around Blunt Body Orex," AIAA, Jun. 2004, pp. 1-11, serial No. 2004-2561.
Gnoffo, P. A., et al., "Conservation Equations and Physical Models for Hypersonic Air Flows in Thermal and Chemical Nonequilibrium," NASA TP-2867, 1989, pp. 1-65.
Wada, Y. et al., "A Flux Splitting Scheme with High-Resolution and Robustness for Discontinuities," AIAA, Jan. 1994, pp. 1-23, serial No. 94-0083.
Otsu, H., et al., "Numerical Investigation of High-Enthalpy Flows Generated by Expansion Tube," AIAA Journal, pp. 2423-2430, 2002, pp. 2423-2430, vol. 40, No. 12.
H. Otsu, et al., "Feasibility Study on the Flight Demonstration for a Reentry Vehicle with the Magnetic Flow Control System," AIAA, 2006, pp. 1-8, serial No. 2006-3566.
T. Yoshino, et al., "Possibility of Thermal Protection in Earth Re-entry Flight by MHD Flow Control with Air-Core Circular Magnet," IEEJ Transactions on Electrical and Electronic Engineering, Jul. 2009, pp. 510-517, vol. 4 Issue 4.
Macheret, S.O., et al., "Magnetohydrodynamic Power Generation For Planetary Entry Vehicles," 35th AIAA Plasmadynamics and Lasers Conference, Jun. 28-Jul. 1, 2004, pp. 1-20, serial No. 2004-2560, Portland, Oregon.
Moses, Robert W., "Regenerative Aerobraking," Space Technology and Applications International Forum (STAIF-2005), Feb. 13-17, 2005, pp. 1-11, Albuquerque, NM, United States.
Vuskovic, L., et al., "Magnetohydrodynamic Power Generation in the Laboratory Simulated Martian Entry Plasma," 15th International Conference on MHD Energy Conversion; May 24-27, 2005, pp. 1-9, Moscow, Russia.
Ali, H., "Magnetohydrodynamic Energy Generation and Flow Control for Planetary Entry Vehicles," Doctoral Dissertation, Aug. 2019, pp. 1-243, Georgia Institute of Technology.
Thompson, Kyle B., et al., "Recent Improvements to the LAURA and HARA Codes," AIAA Aviation 2020 Forum, Jun. 15-19, 2020, pp. 1-8, serial No. 2020-3030, Virtual Event.
Thompson, K., et al. "LAURA Users Manual: 5.6," NASA TM 2020-220566, 2020, pp. 1-105.
Johnston, C. O., et al., "Modeling of Nonequilibrium CO Fourth-Positive and CN Violet Emission in CO2-N2 Gases," Journal of Quantitative Spectroscopy and Radiative Transfer, 2014, pp. 303-317, vol. 149.
B. Parent, et al., "Modeling Weakly-Ionized Plasmas in Magnetic Field: A New Computationally-Efficient Approach", Journal of Computational Physics, 2015, pp. 779-799, vol. 300.
Parent, B., et al., "Detailed Modeling of Plasmas for Computational Aerodynamics," AIAA Journal, 2016, pp. 898-911, vol. 54, No. 3.
Park, C. "Nonequilibrium Ionization and Radiation in Hydrogen Helium Mixtures", Journal of Thermophysics and Heat Transfer, 2012, pp. 231-243, vol. 26, No. 2.
Gocken, T., "N2-CH4-Ar Chemical Kinetic Model for Simulations of Atmospheric Entry to Titan," Journal of Thermophysics and Heat Transfer, 2007, pp. 9-19, vol. 21, No. 1.
Fujita, K, et al., "Impact of Ablation Gas Kinetics on Hyperbolic Entry Radiative Heating," AIAA, 2006, pp. 1-22, Paper 2006-1185.
Lockwood, Mary Kae, et al., Aerocapture System Analysis for Neptune Mission, Apr. 2006, pp. 1-148.
Non-Final Office Action dated Nov. 22, 2023 Issued by the United States Patent and Trademark Office for U.S. Appl. No. 17/727,009, pp. 1-26.
Final Office Action dated Mar. 20, 2024 Issued by the United States Patent and Trademark Office for U.S. Appl. No. 17/727,009, pp. 1-17.
Chaffe, Norman, Space Shuttle Technical Conference, Jan. 1985, NASA, URL: https://ntrs.nasa.gov/citations/198500008580(Year:1985).
Kawamura et al., Magnetoaerodynamic Force on a Magnetized Body in a Partially Ionized Flow, Mar. 2013, Journal of Spacecraft and Rockets, vol. 50 No. 2 (Year:2013).
Parent et al., Effect of Plasma Sheaths on Earth Re-entry MHD Processes, Jan. 2022, AIAA SciTech (Year: 2021).

* cited by examiner $\Phi = 90$ degrees
$\theta = -90$ to $+90$ degrees $|B| = 1\text{Tesla}$
$B_x = |B|*\cos(\theta)$
$B_y = |B|*\sin(\theta)$
$B_z = 0$

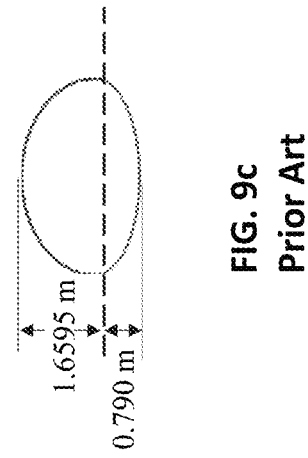
FIG. 9c
Prior Art
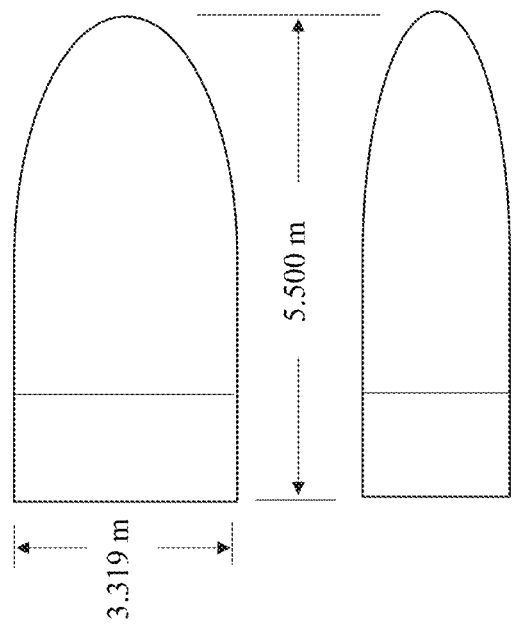
FIG. 9a
Prior Art
FIG. 9b
Prior Art

ELECTRODE DESIGN FOR LIFT AUGMENTATION AND POWER GENERATION OF ATMOSPHERIC ENTRY VEHICLES DURING AEROCAPTURE AND ENTRY, DESCENT, AND LANDING MANEUVERS

CROSS-REFERENCE TO RELATED PATENT APPLICATION(S)

This patent application claims the benefit of and priority to U.S. Provisional Patent Application Serial Nos. 63/178,720 entitled Method for Lift Augmentation of Atmospheric Entry Vehicles During Aerocapture and Entry, Descent, and Landing Maneuvers and 63/178,761 entitled Electrode Design for Lift Augmentation and Power Generation of Atmospheric Entry Vehicles During Aerocapture and Entry, Descent, and Landing Maneuvers, both filed on Apr. 23, 2021, the contents of which is hereby incorporated by reference in its entirety for any and all non-limiting purposes.

Additionally, reference is made to U.S. patent application Ser. No. 17/727,009, for System and Method for Lift Augmentation of Atmospheric Entry Vehicles During Aerocapture and Entry, Descent, and Landing Maneuvers, filed Apr. 22, 2022, which is incorporated herein by reference for any and all non-limiting purposes.

STATEMENT REGARDING FEDERALLY SPONSORED RESEARCH OR DEVELOPMENT

The invention described herein was made in the performance of work under a NASA contract and by an employee/employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

In the continuing quest to explore and understand space, spacecraft design is of critical importance. Researchers continue to look for ways to improve spacecraft for long-duration scientific orbits around distant Solar System destinations without the need for heavy fuel loads which limit performance, mission duration, and mass available for science payloads.

The process of aerocapture has become a process of particular interest as a near fuel-less option for orbit insertion. The aerocapture process primarily relies on a planet's (or other celestial body's) atmosphere to achieve orbit, wherein the aerodynamic drag generated as the spacecraft enters the atmosphere slows the spacecraft and allows for it to be captured by the planet. During this pass through the atmosphere, significant thermal energy is created. Accordingly, the spacecraft must be protected from this extreme heat. The spacecraft require thermal protection systems, such as aeroshells, which encase the spacecraft in a protective shell.

Blunt body aeroshells offer the best decelerators but are constrained by the amount of lift that can be created by a blunt body aeroshell shape for maintaining course during entry trajectories and prescribed flight corridors. Changing in flight the center of gravity via mass ballast and changing the center of pressure via trim tabs can increase lift (for the blunt body aeroshells) but not sufficient for entries at Neptune and other worlds with atmospheres. As determined in the 2004 Neptune study with a summary of findings published in NASA's April 2006 document entitled Aerocapture Systems Analysis for a Neptune Mission which is incorporated herein by reference in its entirety, the tight entry corridor at Neptune requires an aeroshell shape capable of L/D (Lift-to-Drag) ratios around 0.8. Blunt body aeroshells generally provide a L/D ratio of around 0.2. Hence, that study selected a Mid L/D shape capable of achieving the higher L/D ratio. A key finding of that 2004 Neptune study is that the "[thermal protection system] TPS thicknesses are beyond current manufacturing experience for carbon phenolic for this shape and acreage." The Mid L/D concept described in the 2004 Neptune study suggests a complex system of structure and instruments that are integrated into a launch vehicle that is much longer than necessary but required to meet the diameter of the Mid L/D concept determined for Neptune. The Mid L/D concept was able to deliver about 40% more mass to Neptune orbit than an all propulsive approach. However, that Mid L/D aerocapture mission concept still required over 10 years of cruise time to reach Neptune. These and other factors offered motivation for studying a new approach for a spacecraft capable of entering Neptune's atmosphere which provides improvements in, e.g., trip time, net mass delivered, entry velocity vs. flight time.

Previous studies have explored the use of magnetic forces to control the flow near the forebody of an aeroshell during re-entry for reducing the thermal loads on the spacecraft. The principles of magnetohydrodynamic (MHD) flow control mechanisms were first extended to the practice of EDL (planetary Entry, Descent, Landing) at Mars about 20 years ago. The basis for the initial study resided in the recognition that the electron number densities observed in aerothermal analysis results for Mars entries were similar orders of magnitude as those required for MHD power generation practices on Earth. Hence, the preliminary work for Mars entries looked to harvest electrical power from the ionized flow occurring during the hypersonic entry phase at Mars. The initial study also looked at harvesting the atmosphere of Mars, especially oxygen, that was dissociated from the 96% carbon dioxide atmosphere by the elevated temperatures and pressures occurring during the hypersonic entry. It was suggested at that time that harvesting electricity from the flow field would likely produce Lorentz Forces that could be used to steer the spacecraft. A decade after this initial work, NASA funded a Fellowship PhD program to explore the creation of MHD drag forces at Mars for extending the prior foundational research. That research further demonstrated that electrical current could be harvested and MHD drag forces could be produced under simulated Martian entry conditions. The results of this research are described in Ali, H., Magnetohydrodynamic Energy Generation and Flow Control for Planetary Entry Vehicles, Doctoral Dissertation, Georgia Institute of Technology, August 2019, which is incorporated herein by reference in its entirety.

The goal, illustrated in prior art FIG. 1, is to push the bow shock layer away from the spacecraft for reducing the heat reaching the forebody surface of the spacecraft. As shown in FIG. 1, magnetic dipole (e.g., a current loop) and ionized gas crossing the B field lines creates a circular current and thus Lorentz forces pushing the bow shock upstream. With the increased shock stand-off distance there is reduced peak heat flux. But, in order to increase the bow shock standoff distance, large magnetic fields are required, which therefore requires massive magnet(s) placed near the forebody of the spacecraft, greatly limiting its feasibility.

Accordingly, for at least these and other reasons, there continues to be a need in the art for improved spacecraft design and operation for use in exploring planets and celestial bodies.

BRIEF SUMMARY

A first non-limiting embodiment directed to a magnetohydrodynamic (MHD) flow control system for use with an aeroshell of a spacecraft includes: at least a first pair of electrodes embedded in a first predetermined portion of the aeroshell; and a magnet placed on a second predetermined portion of an inward facing surface of the aeroshell, wherein the at least a first pair of electrodes and the magnet are in magnetoelectric proximity to each other.

A second non-limiting embodiment directed to an aeroshell for use with a spacecraft includes: a blunt-body configuration having at least one channel formed therein; at least a first pair of electrodes embedded in the at least one channel; a magnet placed on an inward facing surface of the aeroshell and in magnetoelectric proximity to the first pair of electrodes.

A third non-limiting embodiment directed to an aeroshell for use with a spacecraft includes: a blunt-body configuration having multiple channels formed therein; multiple electrode pairs embedded in at least one of the multiple channels; and at least one magnet associated with each of the multiple electrode pairs, the at least one magnet being placed on an inward facing surface of the aeroshell and in magnetoelectric proximity to at least one of the multiple electrode pairs.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIGS. 9a, 9b, 9c are schematics of a prior art mid L/D aeroshell used in the analysis of the MHD approach of the embodiments described herein;

DETAILED DESCRIPTION OF THE EMBODIMENTS

The MHD approach in the present embodiments substantially improves the existing processes in that smaller magnetic fields, requiring far less mass, are placed away from the forebody of the spacecraft to produce Lorentz forces that augment the lift and the drag forces for guidance, navigation, and control of the spacecraft, as explained herein. The embodiments described below facilitate lift generation for enabling the use of blunt bodies and other aeroshell shapes to meet stringent entry parameters for several mission destinations of interest to NASA, including Neptune and Mars. More particularly, the embodiments herein provide for a (MHD) flow control system which provides for additional thermal protection of the electrodes.

It has been documented and well understood how the principles of MHD could be applied to entry bodies to reduce thermal stresses on the aeroshell as well as to augment drag and to harvest atmospheric gases and to generate electrical power.

MHD Theory for EDL Applications

Figure 1:
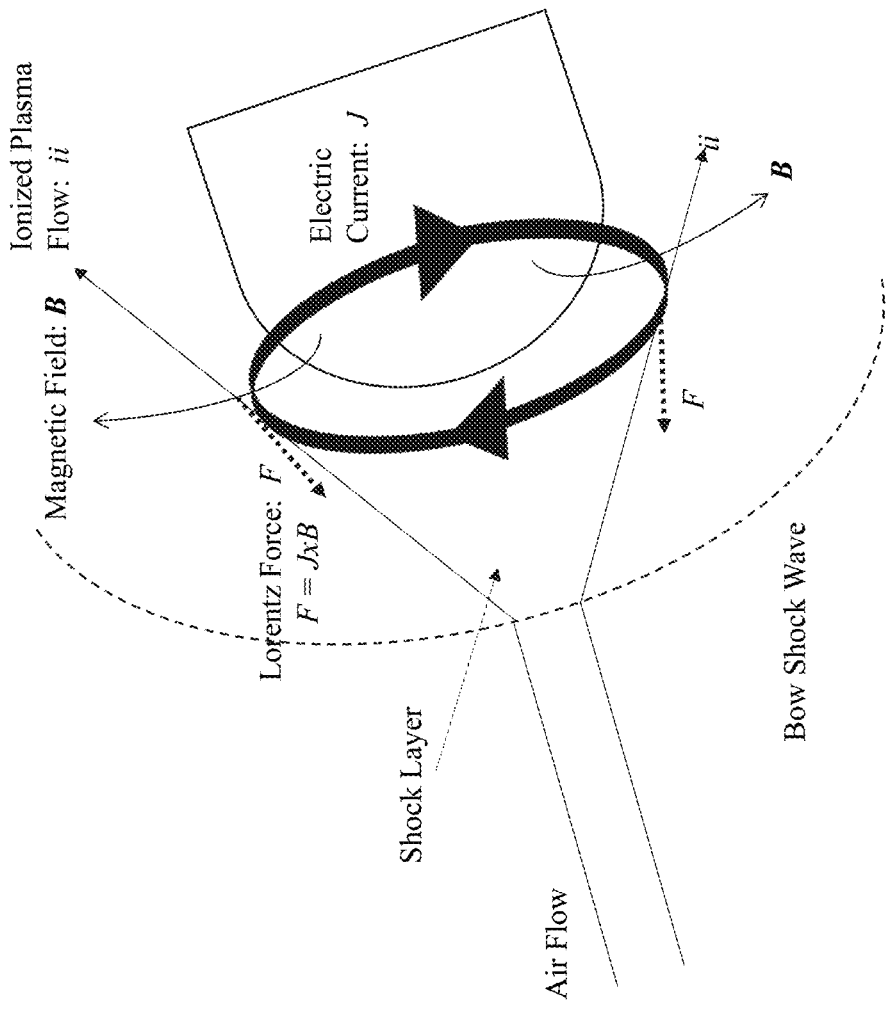
FIG. 1 is a prior art illustration of the desired result from implementation of an embodiment described herein.
Figure 2:
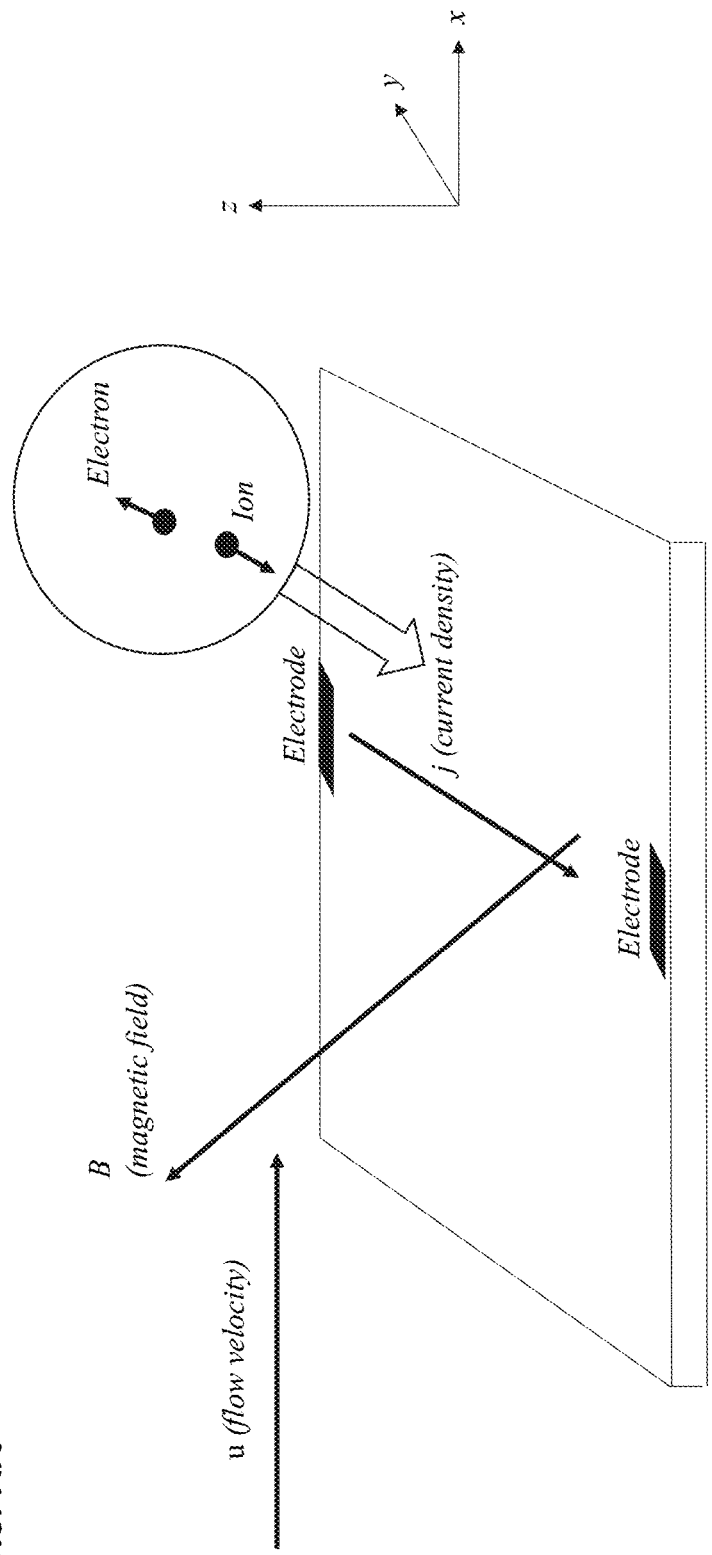
FIG. 2 is a prior art illustration summarizing the physics principles behind implementation of an embodiment described herein.

As shown in the schematic of FIG. 2, the principles of MHD stem from the theory of electrical currents flowing in the presence of a magnetic field. In this case, the electrical current flow is created when the conductivity of the planet's (or other celestial body's) atmosphere is sufficient to facilitate current flow between electrodes with opposite polarity that are placed on the outer surface of the spacecraft. Hence, the conductivity of the flow is critical to the use of this MHD approach during atmospheric entries.

When electrically conducting fluid crosses magnetic field lines, charged particles experience Lorentz forces $\vec{F}_L = q\vec{u} \times \vec{B}$, and since the charges of electrons and ions are of opposite signs, the electrons and ions are pulled apart, which creates a Faraday electromotive force (emf). If the circuit is closed, current flows:

$$j = (1-K)\sigma u B_z \quad (1)$$

Here σ is the electrical conductivity, and K is the load factor (load resistance vs plasma resistance). Interaction of the induced current with the B field creates body force per unit area:

$$\vec{F} = \vec{j} \times \vec{B} \quad (2)$$

If the B field is inclined with respect to the surface, the force would have both decelerating(drag) and normal (lift) components:

$$F_x = -(1-K)\sigma u B_z^2 \quad (3)$$

$$F_z = (1-K)\sigma u B_z B_x \quad (4)$$

The scalar electrical conductivity is proportional to the number density $n_e$ of principal charge carriers (electrons)

and inversely proportional to the rate, or frequency, of their collisions with ions ($v_{ei}$) and neutral molecules ($v_{en}$):

$$\sigma = \frac{e^2 n_e}{m(v_{ei} + v_{en})} \quad (5)$$

Here e and m are the electron charge and mass, respectively.

At low ionization fraction $$\frac{n_e}{n} \leq 10^{-3} - 10^{-2}$$

(n is the number density of gas), electrons collide mostly with neutral molecules, and the conductivity is proportional to the ionization fraction:

$$\sigma \approx 3 \times 10^5 \frac{n_e}{n} S/m \quad (6)$$

In this regime, the conductivity in hypersonic shock and boundary layers reaches ~10-100 S/m.

At high ionization fraction, $$\frac{n_e}{n} \geq 10^{-3} - 10^{-2},$$

electrons collide mostly with ions, and the conductivity does not depend on the ionization fraction, instead being determined by the electron temperature:

$$\sigma \approx const \times T_e^{3/2} \quad (7)$$

In this regime, the conductivity reaches ~1000-3000 S/m.

Hall Effect

With the induced electric field E perpendicular to the B field, electrons and ions have $\vec{E} \times \vec{B}$ drift motion along the flow, which effectively diverts their cross-low motion and thus reduces MHD body forces. This can be expressed as an effective conductivity lower than the scalar one.

Ion Slip Effect

MHD effects increase with flow velocity. However, as B field increases, the motion of electrons and ions is retarded so much that the ion-electron fluid starts to slip against the bulk neutral gas, and the lower ion-electron velocity reduces the MHD effects (including body forces). This ion slip effect can also be expressed as a reduction in the effective conductivity.

$$\sigma_{eff} = \frac{\tilde{\sigma}}{1 + \tilde{\Omega}^2} \quad (8)$$

Here the conductivity $\tilde{\sigma}$ and the Hall parameter $\tilde{\Omega}$ corrected for ion slip are:

$$\tilde{\sigma} = \frac{\sigma}{1 + \Omega_e \Omega_i}; \tilde{\Omega} = \frac{\Omega_e}{1 + \Omega_e \Omega_i} \quad (9)$$

Here σ is the scalar conductivity, and the electron and ion Hall parameters are:

$$\Omega_e = \frac{eB}{m(v_{ei} + v_{en})}; \Omega_i = \frac{eB}{Mv_{in}} \quad (10)$$

(M and $v_{in}$ are the ion mass and ion-neutral collision frequency, respectively).

The performance-reducing Hall and ion slip effects become dominant when the Hall parameter (the product of the electron mobility and the magnetic field) is high, which occurs when the magnetic field is high and the gas density is low. However, these effects can be exploited for modulating axisymmetric forces and moments, as will be illustrated later in one case presented for Mars.

For the embodiments described herein, NASA Langley's CFD code LAURA is used to calculate properties of the flow field around an entry aeroshell. A description of LAURA may be found in Thompson, K., et al., LAURA User's Manual: 5.6, NASA TM 2020-220566, 2020. These calculated properties are then fed into MHD plasma code CFD-WARP to calculate MHD properties of the flow and estimate Lorentz forces generated and electrical power available on a local region of the aeroshell during that entry condition. The CFDWARP code has been described in the prior art at, for example, B Parent, et al., Modeling Weakly-Ionized Plasmas in Magnetic Field: A New Computationally-Efficient Approach, Journal of Computational Physics, Vol. 300, Pages 779-799, 2015, which is incorporated herein by reference in its entirety.

Figure 3B:
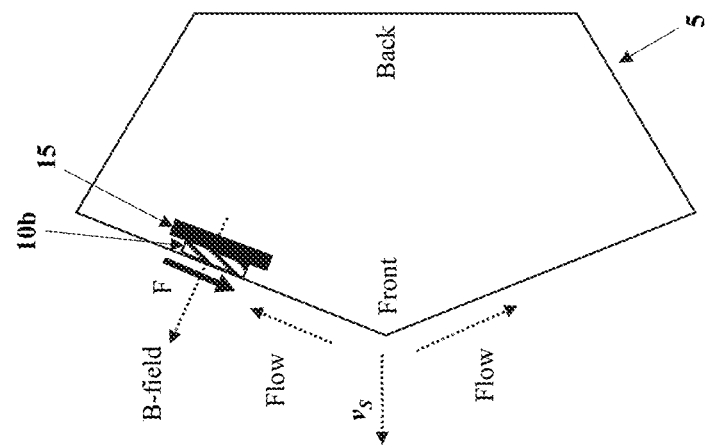
FIGS. 3a, 3b, 3c, 3d, 3e illustrate various views of an MHD patch implemented in accordance with an embodiment described herein.
Figure 3A:
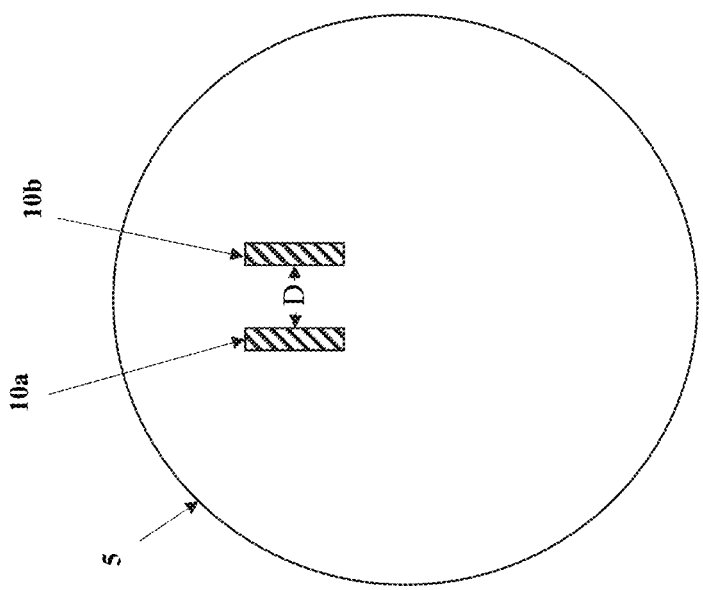
Figure 3D:
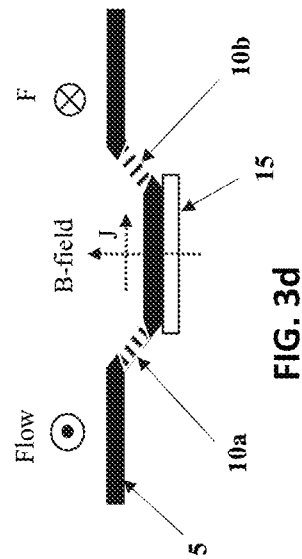
Figure 3E:
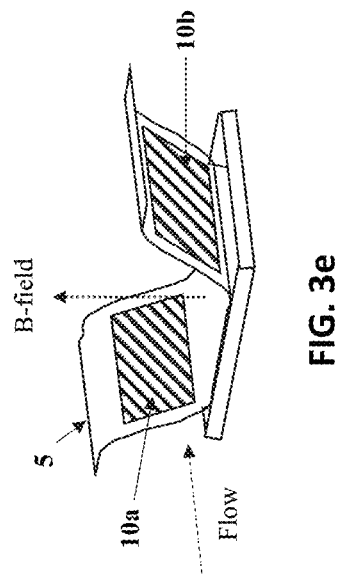
Figure 3C:
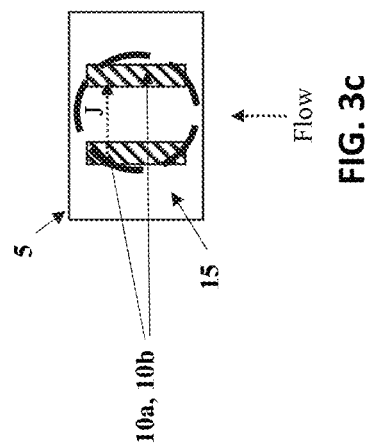

In one embodiment, an MHD patch effector device is integrated with a blunt-body aeroshell for generating Lorentz forces as shown in FIGS. 3a, 3b, 3c, 3d and 3e. The MHD patch effector may consist of: 1) a pair of electrodes 10a, 10b embedded in the surface of the aeroshell 5 at a prescribed distance apart, wherein the electrodes are angled from facing directly toward the shock layer closest to the electrode in a conformal recessed configuration (FIGS. 3d, 3e) and 2) a magnet 15 placed just below the aeroshell's outer surface, with the magnetic field (B) protruding out of the surface. The magnet 15 could be a permanent magnet(s) or electromagnet(s), e.g., coil, self-powered by the electrical energy harvested from the flow or powered by another energy source. FIG. 3a shows the front view of the aeroshell 5 with (+/−) electrodes 10a, 10b embedded therein. FIG. 3b is a side, cross-sectional view of FIG. 3a, wherein the aeroshell 5 with electrode 10b is shown, as well as the magnet 15 on the inside of the aeroshell, opposite the electrodes on the outside of the aeroshell. FIG. 3b also includes direction indicators for the magnetic field (B), Flow of air, plasma around the aeroshell and electrodes (Flow) and spaceship velocity vector vs and force (F). FIGS. 3c, 3d and 3e offer alternative views of the MHD patch effector device with directional indicators for magnetic field (B), (Flow), force (F) and current density (J), wherein: F=J×B.

Figure 4:
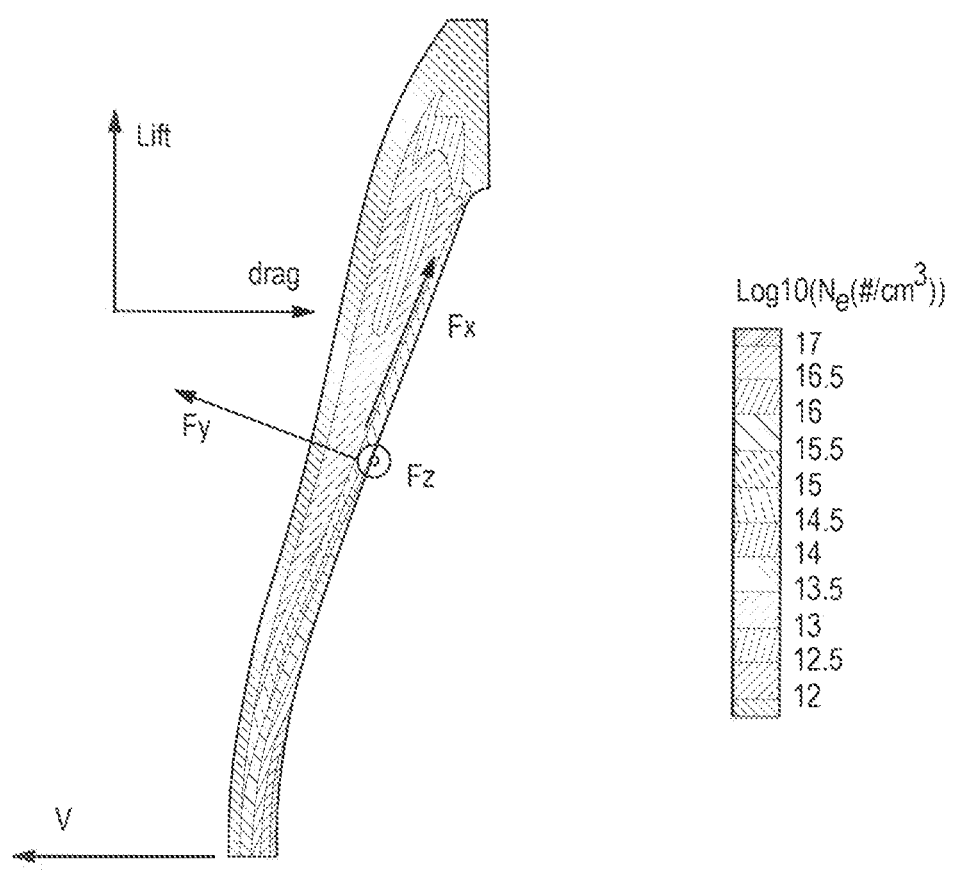
FIG. 4 shows the Lorentz Forces ($F_x$, $F_y$, $F_z$) on a blunt body aeroshell in the presence of ionized flow in accordance with an embodiment described herein.

FIG. 4 shows the Lorentz Forces ($F_x$, $F_y$, $F_z$) on a blunt body aeroshell in the presence of ionized flow. For an initial case, the MHD results are as follows. Force on the gas by the electromagnetic fields (J×B)=(−2718, −103, +103) Newtons (N). That represents a force of 2718 N in the direction opposite of the "bulk" flow, a force of 103 N that acts normal to the surface that is pressing on the surface, and a force of 103 N that acts tangential to the surface and perpendicular to the "Bulk" flow direction and perpendicular to the surface normal direction. Whether the force in the X-axis acts as drag depends on the orientation of the modeled aeroshell surface to the velocity vector of the spacecraft. Likewise, whether the force in the Y-axis acts as lift and the force in the Z-axis acts as a rolling moment depends on the orientation of the modeled aeroshell surface to the velocity vector of the spacecraft. For instance, if the modeled aeroshell is located on the underbelly of the mid L/D vehicle (see FIG. 10), then these X-, Y-, and Z-forces can be considered drag, lift, and roll, respectively. However, if these X-, Y-, and Z-forces are acting along an aeroshell representative of a 70-degree cone, then the X-axis force is acting more like a lift force than a drag force, and the Y-axis force is acting more like a drag force than a lift force, while the Z-axis force is representative of a rolling force. Further to the initial example, the rate of energy input to the gas by the electromagnetic fields (E*J)=−3.01 Megawatts; the rate of work done by the electromagnetic fields (V*(J×B))=−29.2 Megawatts; and the rate of heat deposited to the gas by electromagnetic fields (Energy input−work done)=26.2 Megawatts.

Figure 5:
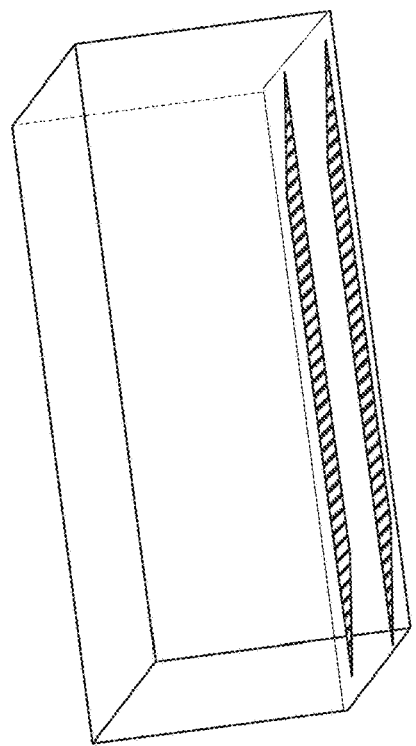
FIG. 5 shows effects of magnetic field orientation on the Lorentz forces and energy values of the MHD approach applied to a specific use case in accordance with an embodiment described herein.
Figure 5:
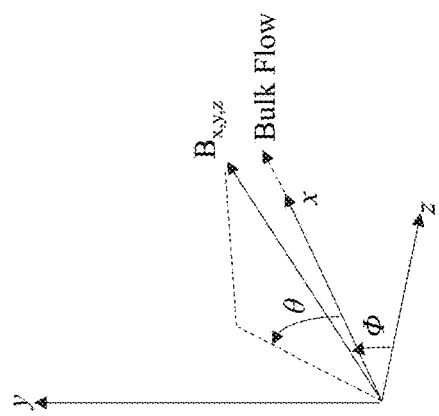

Additional cases were run for understanding the effects of magnetic field orientation on the Lorentz Forces and Energy values of the MHD approach applied to the Neptune entry case of 29.24 km/s at an atmospheric density of 1.45e−4 kg/m3. A value of 1 Tesla was used for these additional cases. Shown in FIG. 5, the orientation of the magnetic field varied in the X-Y plane for 180 degrees (θ=−90 to +90 degrees). The magnetic field remained orthogonal to the Z-axis for these additional cases.

Figure 6:
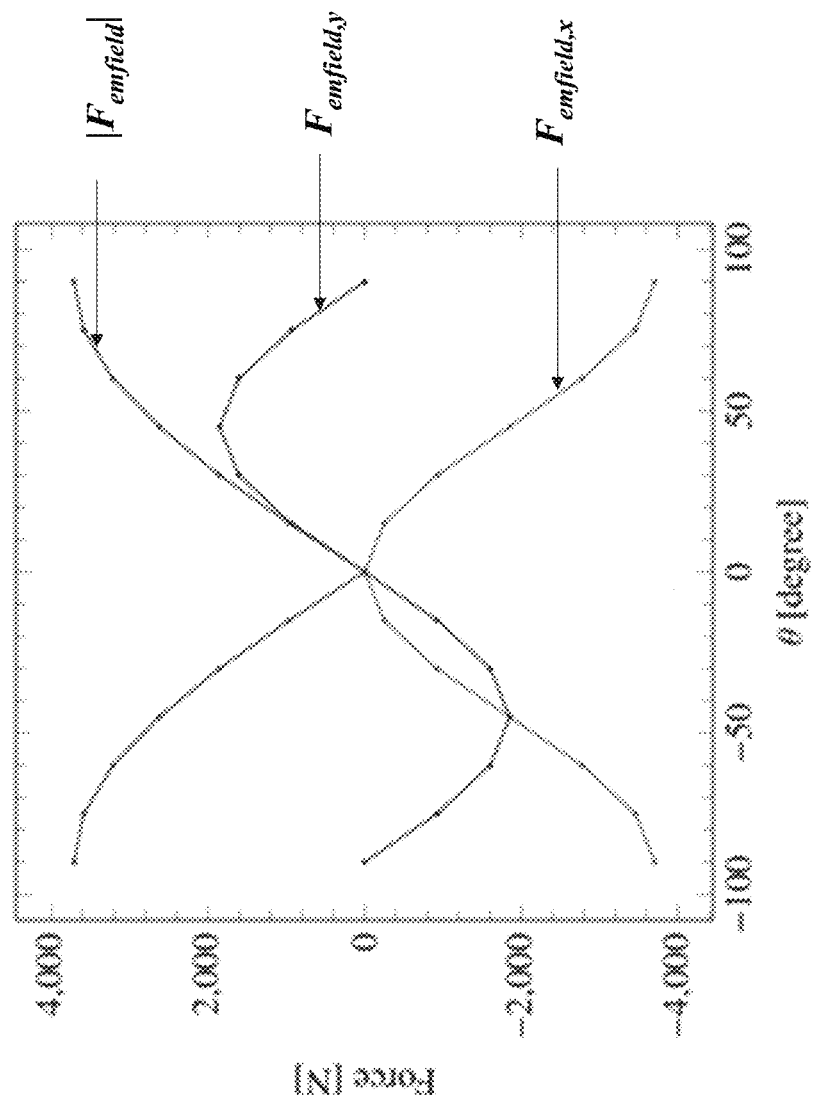
FIG. 6 shows the resulting Lorentz forces in accordance with the magnetic field orientations of FIG. 5.

The resulting Lorentz Forces are illustrated in FIG. 6 for the values of θ between −90 degrees and +90 degrees. The force in the Y-axis (perpendicular to the aeroshell surface) is maximal when θ=+/−45 degrees ($F_{emfield,y}$). The force in the X-axis ("bulk" flow direction) is maximal when θ is +/−90 degrees ($F_{emfield,x}$).

A force of 4000 Newtons in these cases translates in an electromagnetic force per surface area of 200 kN/m2. Therefore, an MHD patch effector having an area of 1 m² would produce a force of 2.0e+5 N. That value is the same order of magnitude as the "whole body" drag and lift forces computed by LAURA for the Neptune entry velocity and atmospheric density. The math comes down to the sizing and orientation of the magnetic field to produce the desire drag and lift vectors for controlling the entry body. The entry body could be a number of shapes, possibly including a 70-degree cone.

The distance between the two electrodes (D) (See FIG. 3a) was varied between 0.07 meters and 0.97 meters. Zero current boundary conditions were imposed everywhere except at the two electrodes. Both electrodes were given the same voltage (short circuit). Flow properties are frozen to represent no coupling. Hall effect and ion slip effects are taken into consideration.

Figure 7:
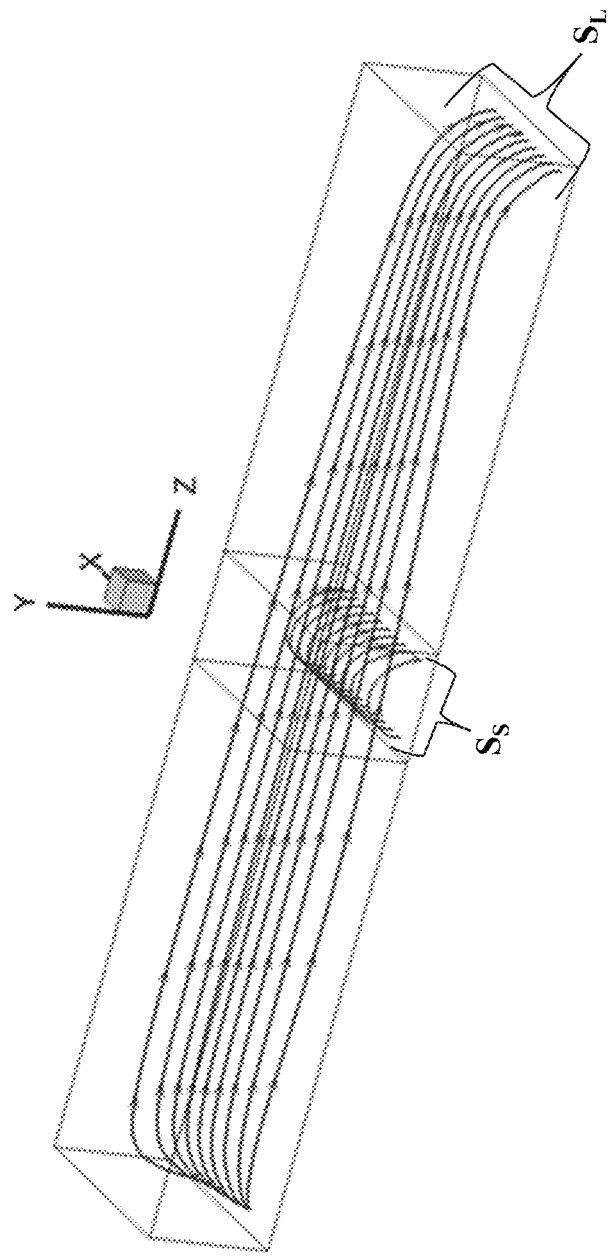
FIG. 7 illustrates the effect of distance between electrodes on the current density streamlines in accordance with an embodiment described herein.

The effect of distance between electrodes on the current density streamlines is illustrated in FIG. 7. The longer streamlines ($S_L$) represent the case for D=0.97 meters spacing while the shorter streamlines ($S_S$) represent the case for D=0.07 meters.

Figure 8:
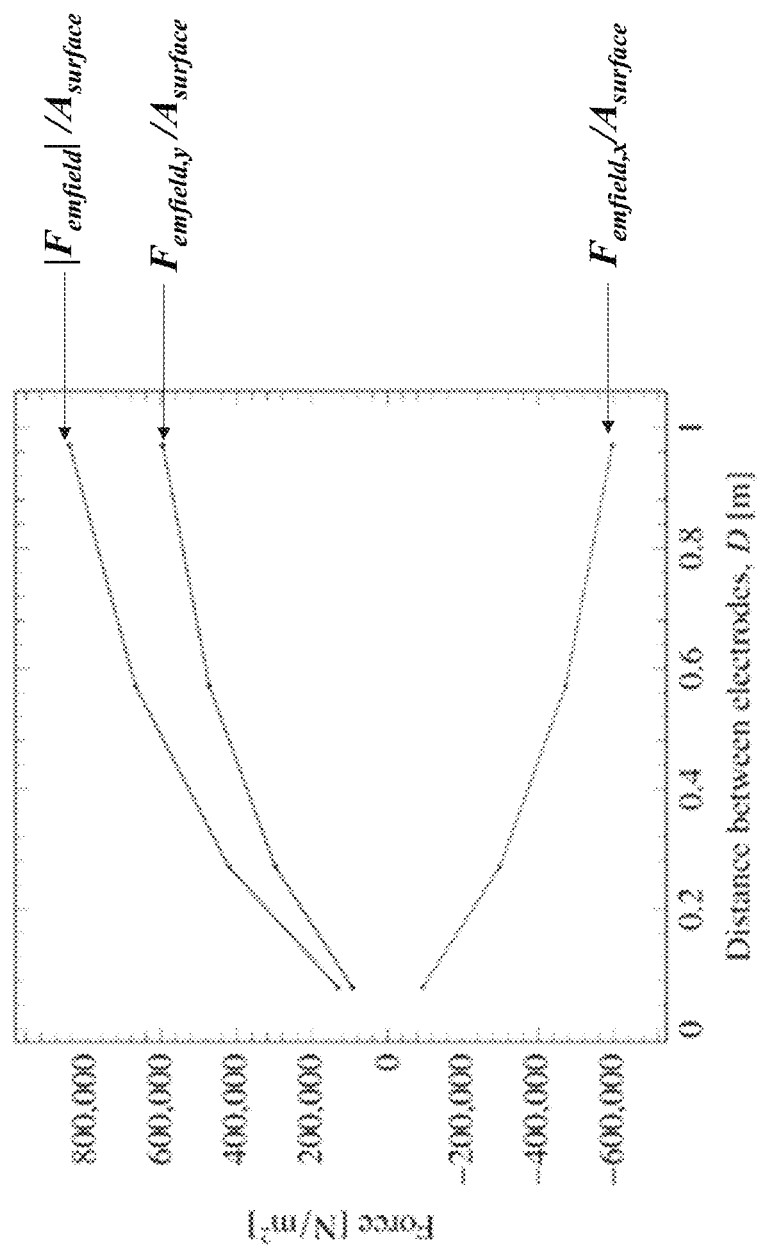
FIG. 8 shows the resulting force values in accordance with the distance between electrodes of FIG. 7.

The effect of electrode spacing (D) (See FIG. 3a) on Lorentz forces is shown in FIG. 8. Force increases when the electrode spacing is increased. This effect is due to longer length of the current streamlines being more perpendicular to the flow and the magnetic field as D is increased. For instance, the shape of the shorter streamlines $S_S$ for the shorter spacing look more circular when compared to the much longer streamlines $S_L$ for the wider spacing. Hence, a longer portion of the $S_L$ streamlines, which represent J, are orthogonal to the B-field than the portion of the shorter streamlines $S_S$.

The force values (shown in FIG. 8) reach up to 800 kN/m2. Hence, a "MHD patch" that encompasses 1 m² of the aeroshell can, theoretically, produce up to 800 kN force. That value is not only the same order of magnitude but also exceeds the value computed by LAURA. Hence, the L/D ratio exceeds 1.0 for this situation. This is a ground-breaking discovery for Neptune missions. And performance during atmospheric entries at Earth, such as return from the Moon or return from Mars, is expected to be similar to this Neptune case.

The following paragraphs provide further support of the description and embodiments discussed above with respect to particular missions, i.e., Neptune and Mars. Those skilled in the art with the benefit of this disclosure will appreciate that the examples are not intended to limit the scope of the disclosure, but rather to provide illustrative examples of certain embodiments.

The criteria used to select a region of flow along the spacecraft for further analysis may be derived from the principles of MHD illustrated above in FIG. 2. Conductivity may be deemed the most important criteria in this example. As explained above, conductivity is dependent on temperature and density conditions of the flow field near the surface of the vehicle. A second criteria may be the velocity of the flow in terms of magnitude and direction for establishing the location and placement of the electrodes. A third criteria may be the geometric orientation of the magnetic (B-) field with respect to the current flow to produce Lorentz forces with axis components in the orthogonal coordinate system that are in the "drag direction" and "lift direction" and "rolling moment" direction.

The LAURA Navier-Stokes solver was applied for the baseline Mars and Neptune flowfields considered in the embodiments described herein. Two-temperature thermochemical nonequilibrium was assumed, where the chemical kinetics for the Mars case are taken from Johnston and Brandis, Modeling of Nonequilibrium CO Fourth-Positive and CN Violet Emission in CO2—N2 Gases, Journal of Quantitative Spectroscopy and Radiative Transfer, Vol. 149, 2014, pp. 303-317 and for the Neptune case from a combination of Park, C. "Nonequilibrium Ionization and Radiation in Hydrogen Helium Mixtures", Journal of Thermophysics and Heat Transfer, Vol. 26, No. 2, 2012, pp. 231-243, Gocken, T., "N2-CH4-Ar Chemical Kinetic Model for Simulations of Atmospheric Entry to Titan," Journal of Thermophysics and Heat Transfer, Vol. 21, No. 1, 2007, pp. 9-1, Fujita K, Yamada T, and Ishii N., "Impact of Ablation Gas Kinetics on Hyperbolic Entry Radiative Heating," AIAA Paper 2006-1185, 2006, and Johnston and Brandis. All references are incorporated herein by reference. The wall was assumed fully catalytic and in radiative equilibrium. The solution and grid convergence criteria applied were consistent with the state-of-the-art applied for NASA flight programs.

Figure 10:
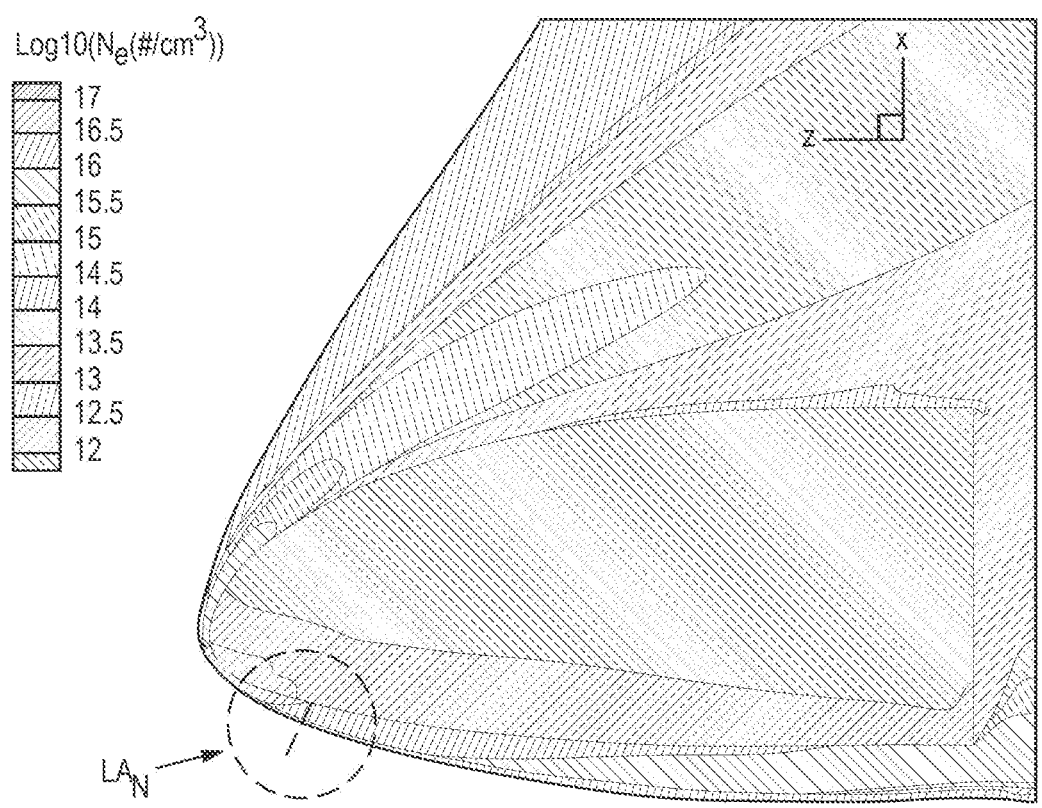
FIG. 10 illustrates the location of the mid L/D aeroshell which was selected for analysis of the MHD approach of the embodiments described herein as applied to a first specific use case.

For an example Neptune case, the team reviewed the aerothermal analysis and other mission results of the 2004 Neptune study for the mid L/D aeroshell shown in FIGS. 9a (top view), 9b (side view) and 9c (aft view). The location selected $LA_N$ for further analysis is shown in FIG. 10 based on the criteria stated above. The entry conditions used in the 2004 Neptune study were selected.

Figure 11:
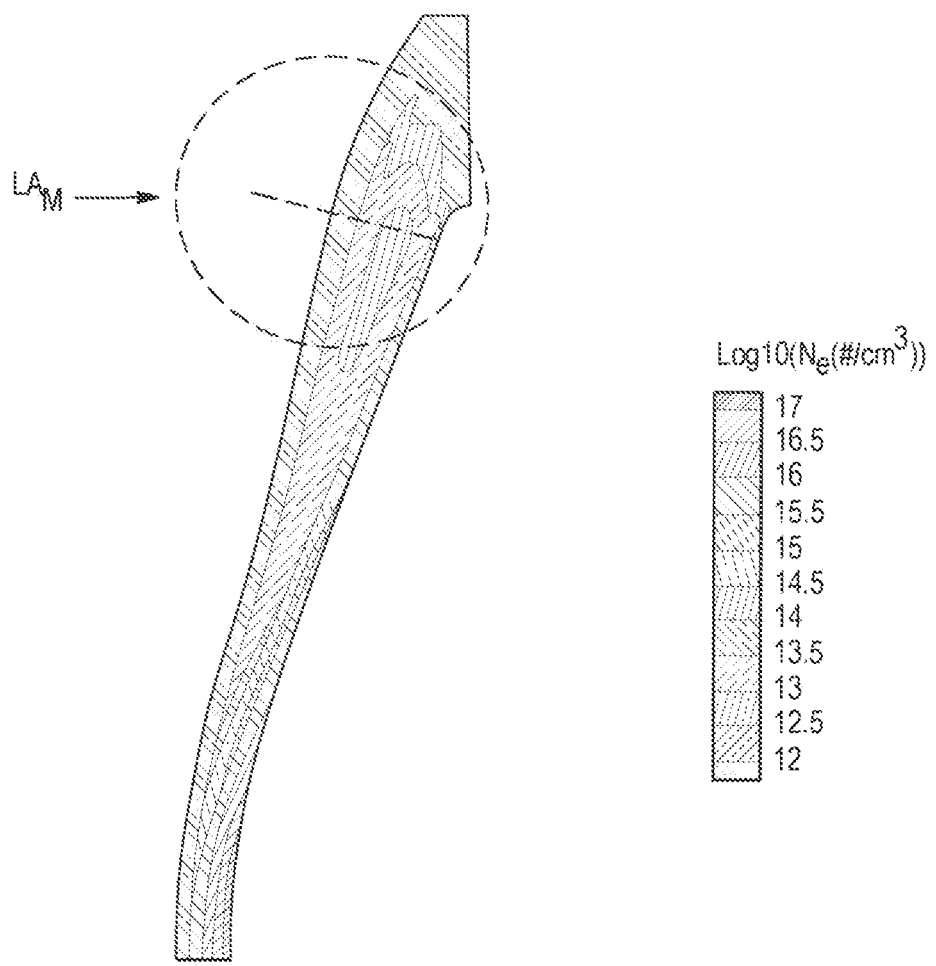
FIG. 11 illustrates the location of the mid L/D aeroshell which was selected for analysis of the MHD approach of the embodiments described herein as applied to a second specific use case.

For a Mars example, the team reviewed several mission cases and selected a blunt body aeroshell. The location $LA_M$ selected for further analysis is shown in FIG. 11 based on the criteria stated above. However, for Mars, a higher entry velocity representing a faster flight to Mars was selected.

For the Neptune entry, a two-temperature thermochemical nonequilibrium flow field was modeled in LAURA for the geometry from Edquist, Karl T., et al., "Configuration, Aerodynamics, and Stability Analysis for a Neptune Aerocapture Orbiter," AIAA 2004-4953, AIAA Atmospheric Flight Mechanics Conference and Exhibit, 16-19 Aug. 2004, Providence, Rhode Island, L/D=0.8, 40 degrees Angle of Attack, 29.24 km/s entry velocity at an atmospheric density of 1.45e−4 kg/m3. Free-stream mass fractions of 0.6246 H2, 0.2909 He, and 0.0846 CH4 were used. The species included in the simulation are H2, H, H+, He, He+, e−, CH4, CH3, CH2, CH, C2, C, and C+. Temperature, pressure, and electron number densities were calculated. For the 29 km/s Neptune case, the "whole body" drag=5.6487e+05 N and lift=4.4911e+05 N. An additional case was run in LAURA for comparison to the 2004 case. For the 35 km/s Neptune case, the "whole body" drag=8.3943e+05 N and lift=6.5381e+05 N.

For the Mars entry, a two-temperature thermochemical nonequilibrium flow field was modeled in LAURA to represent a HIAD at 0 degrees Angle of Attack, 9 km/s entry velocity at an atmospheric density of 4.4e-5 kg/m3. Free-stream mass fractions of 0.97 CO2 and 0.03 N2 were used. The species included in the simulation are CO2, N2, CO, NO, O2, CN, C2, C, N, O, N2+, CO+, NO+, C+N+, 0+, and e−. Temperature, pressure, and electron number densities were calculated. The HIAD geometry consists of a 70-degree sphere-cone with a 10-meter nose radius, 17.2-meter maximum diameter, and an 0.35-meter shoulder radius. The "whole body" drag value of 7.0887e+05 N was calculated by LAURA for the Mars case at 9.0 km/s, 4.4e−5 kg/m3. Additional Mars cases were run in LAURA for comparison. At 7.5 km/s, 4.4e−5 kg/m3: Drag=4.9227e+05 N. At 9.0 km/s, 4.4e−4 kg/m3: Drag=7.0887e+06 N. At 7.5 km/s, 4.4e−4 kg/m3: Drag=4.9227e+06 N.

Figure 12:
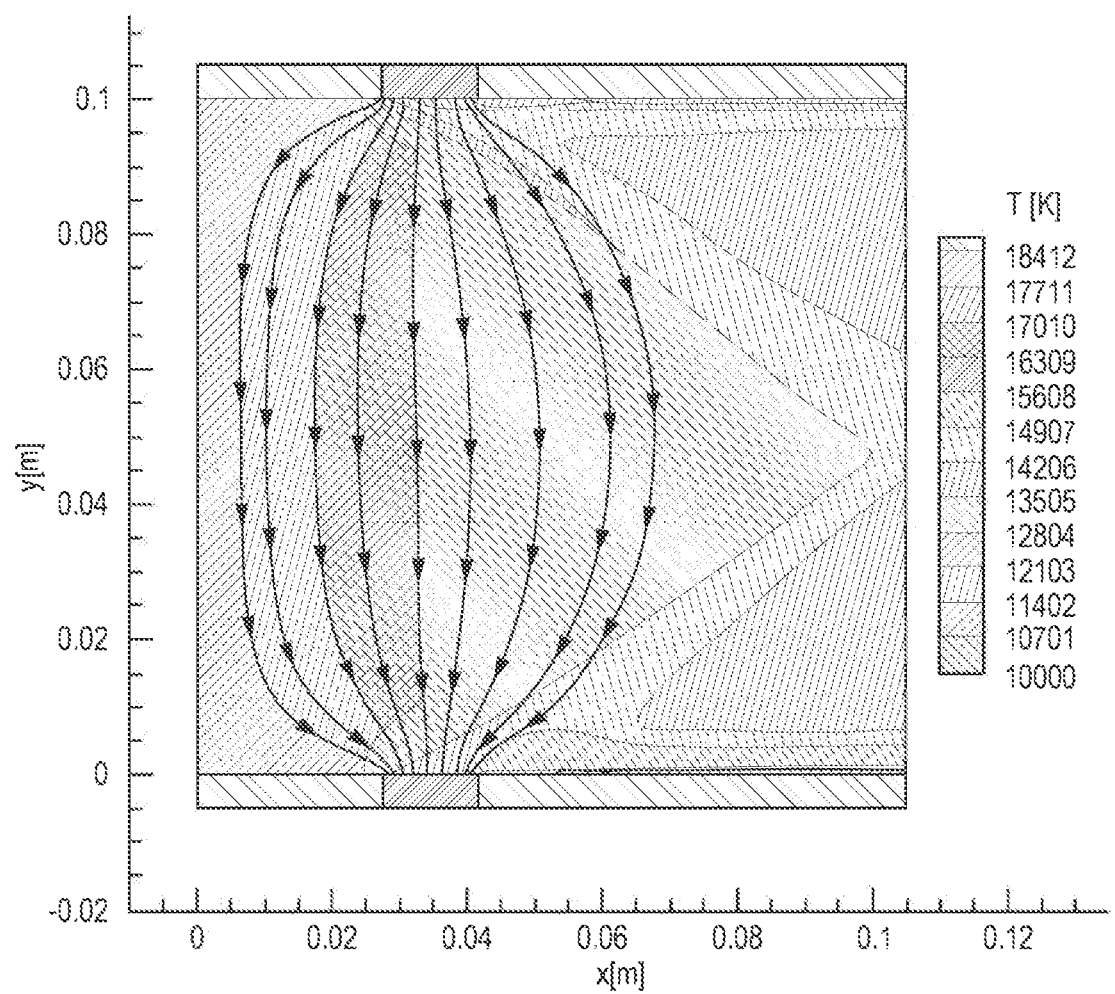
FIG. 12 shows temperature contours of the flow near the current streamlines created by the electrodes and magnetic field in accordance with the embodiments described herein.

FIG. 12 illustrates the temperature contours of the flow near the current streamlines created by the electrodes and magnetic fields in certain electrode arrangements, also described in co-pending U.S. patent application Ser. No. 17/727,009, entitled System and Method for Lift Augmentation of Atmospheric Entry Vehicles During Aerocapture and Entry, Descent, and Landing Maneuvers. The present embodiments address possible thermal interruptions by provide larger physical separation between the electrodes and the shock layer by lowering the electrodes into the aeroshell surface while also angling the electrodes from facing directly toward the portion of the shock layer closest to the electrode as shown in FIGS. 3a, 3b, 3c, 3d and 3e. In addition to changes in the electrode configuration, different electrode materials may be selected in accordance with mission requirements and expectations.

Lowering the electrodes into a channel configuration the protrudes into the aeroshell structure may add volume to that region of the spacecraft to accommodate their integration. This may lead to additional heat shield and aeroshell designs that accommodate multiple channels at clocked radii originating from the stagnation region (center) of the aeroshell to the outer shoulder of the aeroshell. The length of the channel can depend on the depth of the recession and size of the electrodes. Further, one skilled in the art with the benefit of this disclosure will appreciate that multiple electrode pairs and corresponding magnets may be used in a single channel or in multiple channels in order to provide additional guidance, navigation, and control of the spacecraft.

One skilled in the art will appreciate that while the embodiments herein are generally directed to a single MHD patch, the embodiments are not so limited. Multiple patches having different configurations, e.g., dimensions, electrode spacing, electrode material, etc., may be utilized on an aeroshell in accordance with expected environment. Such alternatives are considered to be well within the scope of the embodiments.

The performance of the "MHD Patch" for Earth entries such as aerocapture missions returning from the Moon or from Mars is expected to be very similar to the large lift forces shown for the Neptune cases illustrated herein.

It is to be understood that the novel concepts described and illustrated herein may assume various alternative configurations, except where expressly specified to the contrary. It is also to be understood that the specific systems, devices and processes illustrated in the attached drawings, and described herein, are simply exemplary embodiments of the embodied concepts defined in the appended claims. Accordingly, specific dimensions and other physical characteristics relating to the embodiments disclosed herein are not to be considered as limiting, unless the claims expressly state otherwise.

Reference in the specification to "one embodiment" or to "an embodiment" means that a particular element, feature, structure, or characteristic described in connection with the embodiments is included in at least one embodiment. The appearance of the phrases "in one embodiment," "in some embodiments," and "in other embodiments" in the specification are not necessarily all referring to the same embodiment or the same set of embodiments.

As used herein, the terms "comprises," "comprising," "includes," "including," "has," "having" or any other variation thereof, are intended to cover a non-exclusive inclusion. For example, a process, method, article, system or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

We claim:

1. A magnetohydrodynamic (MHD) flow control system for use with an aeroshell of a spacecraft comprising:
   at least a first pair of electrodes configured to be embedded in a first predetermined portion of the aeroshell, wherein the at least a first predetermined portion of the aeroshell is a channel having multiple side walls and a bottom portion connecting the multiple side walls having an outward facing surface and an inward facing surface, and further wherein each electrode is embedded within one of the multiple side walls of the channel; and
   a magnet configured for placement on an inward facing surface of the bottom of the channel.

2. The system of claim 1, wherein the magnet is selected from the group consisting of a permanent magnet, an electromagnet and combinations thereof.

3. The system of claim 1, wherein the electrodes are formed of at least one of tungsten and a tungsten alloy.

4. The system of claim 1, wherein the channel includes slanted side walls.

5. The system of claim 4, wherein each electrode of the first pair of electrodes is embedded in a slanted side wall.

6. The system of claim 4, wherein the channel further includes a flat bottom portion connecting the slanted side walls.

7. The system of claim 6, wherein the magnet is located on an inward facing surface of the aeroshell opposite the flat bottom portion of the channel.

8. The system of claim 1, wherein the aeroshell is a blunt-body aeroshell.

9. An aeroshell for use with a spacecraft comprising:
a blunt-body configuration having at least one channel formed therein, wherein the at least one channel has multiple sides and a bottom connecting the multiple sides having an outward facing surface and an inward facing surface;
at least a first pair of electrodes embedded in at least two of the multiple sides of the at least one channel;
a magnet placed on an inward facing surface of the bottom of the least one channel.

10. The aeroshell of claim 9, wherein the channel includes two slanted sides and a flat bottom connecting the two slanted sides.

11. The aeroshell of claim 10, wherein the electrodes of the at least a first electrode pair are embedded in the two slanted sides, and further wherein the electrodes are located opposite one another across the flat bottom.

12. The aeroshell of claim 9, wherein the magnet is placed opposite the flat bottom of the channel.

13. The aeroshell of claim 9, wherein the magnet is selected from the group consisting of a permanent magnet, an electromagnet, and combinations thereof.

14. The system of claim 9, wherein the electrodes are formed of at least one of tungsten and a tungsten alloy.

15. An aeroshell for use with a spacecraft comprising:
multiple channels formed therein, wherein each of the multiple channels has multiple sides and a bottom connecting the multiple sides including an outward facing surface and an inward facing surface;
multiple electrode pairs embedded in at least two of the multiple sides of one of the multiple channels; and
at least one magnet associated with each of the multiple electrode pairs, the at least one magnet being placed on an inward facing surface of the bottom of the one of the multiple channels containing the multiple electrode pairs embedded therein.

16. The aeroshell of claim 15, wherein each of the multiple channel includes two slanted sides and a flat bottom connecting the two slanted sides.

17. The aeroshell of claim 16, wherein the electrodes of each of the multiple electrode pairs are embedded in the two slanted sides of at least one of the multiple channels, and further wherein the electrodes are located opposite one another across the flat bottom.

18. The aeroshell of claim 15, wherein the at least one magnet is placed opposite the flat bottom of the channel.

19. The aeroshell of claim 15, wherein each of the multiple electrode pairs is embedded in a different one of the at least one multiple channels.

* * * * *